(12) United States Patent
Shen et al.

(10) Patent No.: US 12,307,207 B2
(45) Date of Patent: May 20, 2025

(54) METHOD FOR DETERMINING TEXT TOPIC, AND ELECTRONIC DEVICE

(71) Applicant: BEIJING BAIDU NETCOM SCIENCE TECHNOLOGY CO., LTD., Beijing (CN)

(72) Inventors: Dazhong Shen, Beijing (CN); Chuan Qin, Beijing (CN); Chao Wang, Beijing (CN); Zheng Dong, Beijing (CN); Hengshu Zhu, Beijing (CN); Hui Xiong, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 289 days.

(21) Appl. No.: 17/992,041

(22) Filed: Nov. 22, 2022

(65) Prior Publication Data
US 2023/0122093 A1   Apr. 20, 2023

(30) Foreign Application Priority Data
Jan. 17, 2022   (CN) .................. 202210051090.1

(51) Int. Cl.
*G06F 40/30* (2020.01)
*G06F 40/117* (2020.01)
(Continued)

(52) U.S. Cl.
CPC .......... *G06F 40/30* (2020.01); *G06F 40/117* (2020.01); *G06F 40/279* (2020.01); *G06N 20/00* (2019.01)

(58) Field of Classification Search
CPC ...... G06F 40/30; G06F 40/117; G06F 40/279; G06F 40/216; G06F 40/284; G06N 20/00; G06N 7/01
See application file for complete search history.

(56) References Cited

U.S. PATENT DOCUMENTS

| | | | |
|---|---|---|---|
| 9,092,422 B2 * | 7/2015 | Wang ............... | G06F 16/345 |
| 2015/0193425 A1 * | 7/2015 | Kusumura .......... | G06F 40/258 |
| | | | 704/9 |

(Continued)

FOREIGN PATENT DOCUMENTS

| | | | | |
|---|---|---|---|---|
| CN | 110413994 A | * | 11/2019 | ............ G06F 16/35 |
| CN | 110472647 A | | 11/2019 | |

(Continued)

OTHER PUBLICATIONS

Office Action for Chinese Application No. 202210051090.1, dated Jul. 5, 2023, 19 pages.
(Continued)

*Primary Examiner* — Paras D Shah
*Assistant Examiner* — Mulugeta Tuji Dugda
(74) *Attorney, Agent, or Firm* — Lippes Mathias LLP (57) ABSTRACT

A method for determining a text topic includes: after a word sequence corresponding to a text to be processed and a number of spaced words in the text to be processed between each two words in the word sequence are determined, a graph structure corresponding to the text to be processed may be determined based on the number of spaced words between each two words in the text to be processed, a topic distribution corresponding to the text may be determined based on the word sequence and the graph structure, a topic corresponding to the text may be determined based on the topic distribution.

9 Claims, 3 Drawing Sheets

(51) Int. Cl.
    *G06F 40/279*     (2020.01)
    *G06N 20/00*     (2019.01)

(56) References Cited

U.S. PATENT DOCUMENTS

2017/0125012 A1*   5/2017  Kanthak ............... G10L 15/193
2021/0303783 A1*   9/2021  Misra .................... G06F 16/345

FOREIGN PATENT DOCUMENTS

| | | | | |
|---|---|---|---|---|
| CN | 111126060 A | | 5/2020 | |
| CN | 111414487 A | | 7/2020 | |
| CN | 111797409 A | * | 10/2020 | ........... G06F 16/316 |
| CN | 113627135 A | | 11/2021 | |
| JP | 3921523 B2 | * | 5/2007 | ........... G06F 17/271 |

OTHER PUBLICATIONS

Shen, Dazhong, et al.; "Topic Modeling Revisited: A Document Graph-based Neural Network Perspective"; NeurIPS 2021; Dec. 31, 2021; 13 pages.

* cited by examiner

METHOD FOR DETERMINING TEXT TOPIC, AND ELECTRONIC DEVICE

CROSS REFERENCE TO RELATED APPLICATIONS

This application claims priority to Chinese Patent Application No. 202210051090.1, filed on Jan. 17, 2022, the entire disclosure of which is incorporated herein by reference.

TECHNICAL FIELD

The disclosure relates to the technical field of data processing, in particular to the fields of artificial intelligence (AI) such as big data and natural language processing, and specifically relates to a method and an apparatus for determining a text topic, and an electronic device.

BACKGROUND

With the development of AI, there are more and more application scenarios for mining text topics. Therefore, how to accurately determine the text topics has become an urgent problem in the field of natural language processing.

SUMMARY

According to a first aspect of the disclosure, a computer-implemented method for determining a text topic is provided. The method includes: determining a word sequence corresponding to a text to be processed and a number of spaced words in the text to be processed between each two words in the word sequence; determining a graph structure corresponding to the text to be processed based on the number of spaced words; determining a topic distribution corresponding to the text to be processed based on the word sequence and the graph structure; and determining a topic corresponding to the text to be processed based on the topic distribution.

According to a second aspect of the disclosure, an electronic device is provided. The electronic device includes: at least one processor and a memory communicatively coupled to the at least one processor. The memory is stored with instructions executable by the at least one processor. When the instructions are executed by the at least one processor, the at least one processor is caused to determine a word sequence corresponding to a text to be processed and a number of spaced words in the text to be processed between each two words in the word sequence; determine a graph structure corresponding to the text to be processed based on the number of spaced words; determine a topic distribution corresponding to the text to be processed based on the word sequence and the graph structure; and determine a topic corresponding to the text to be processed based on the topic distribution.

According to a third aspect of the disclosure, a non-transitory computer-readable storage medium having computer instructions stored thereon is provided. The computer instructions are configured to cause a computer to implement the method described in the above embodiment. The method includes: determining a word sequence corresponding to a text to be processed and a number of spaced words in the text to be processed between each two words in the word sequence; determining a graph structure corresponding to the text to be processed based on the number of spaced words; determining a topic distribution corresponding to the text to be processed based on the word sequence and the graph structure; and determining a topic corresponding to the text to be processed based on the topic distribution.

It should be understood that the content described in this section is not intended to identify key or important features of the embodiments of the disclosure, nor is it intended to limit the scope of the disclosure. Additional features of the disclosure may be easily understood based on the following description.

BRIEF DESCRIPTION OF THE DRAWINGS

The drawings are used to better understand the solution and do not constitute a limitation to the disclosure.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications may be made to the embodiments described herein without departing from the scope and spirit of the disclosure. For clarity and conciseness, descriptions of well-known functions and structures are omitted in the following description.

Big data, also known as huge amount of data, refers to information that the involved amount of data is so large that it cannot be captured, managed, processed, and organized within a reasonable time through current mainstream software tools to help enterprises make more positive business decisions.

Natural Language Processing (NLP) is an important direction in the field of computer science and artificial intelligence. The content of NLP research includes but is not limited to the following branch fields: text classification, information extraction, automatic summarization, intelligent question answering, topic recommendation, machine translation, topic keyword recognition, knowledge base construction, deep text representation, named entity recognition, text generation, text analysis (lexical, syntactic, grammar, etc.), speech recognition and synthesis, etc.

Generally, there may be mutual dependencies between words in any text. In this disclosure, graph structures may be used to represent the dependencies between words in the text, and the topic corresponding to the text is determined based on the graph structure and the corresponding text distribution labels, so as to improve the accuracy of determining the topic of the text.

Figure 1:
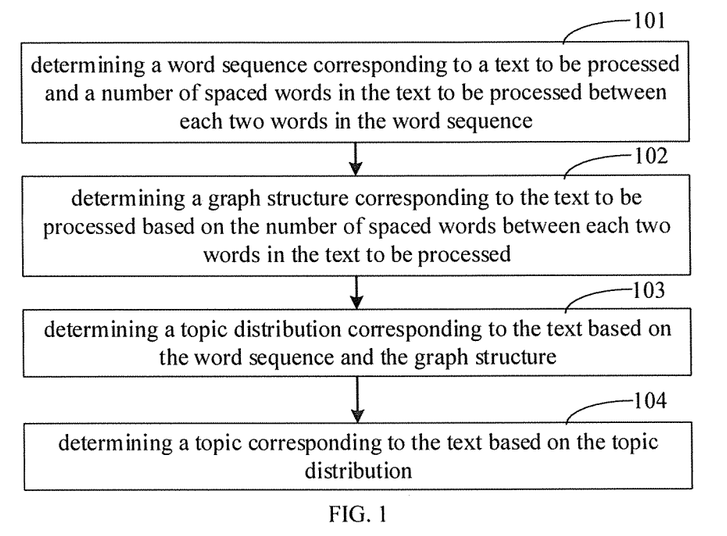
FIG. 1 is a schematic flowchart of a method for determining a text topic according to an embodiment of the disclosure.

FIG. 1 is a schematic flowchart of a method for determining a text topic according to an embodiment of the disclosure. The method may be performed by an electronic device, such as a computer, a terminal, etc.

As shown in FIG. 1, the method includes the following steps at 101-104.

At 101, a word sequence corresponding to a text to be processed and a number of spaced words in the text to be processed between each two words in the word sequence are determined.

In the disclosure, after a server receives any text, the server may determine the text as a text to be processed, segment the text in a word as a unit, and determine the word sequence corresponding to the text according to the order of each word in the text.

It may be understood that since a certain word may appear in the text for multiple times, words at different positions in the word sequence may be the same or different.

In the disclosure, the number of spaced words between each two words in the text to be processed may be determined by subtracting position numbers corresponding to any two words in the word sequence.

At 102, a graph structure corresponding to the text to be processed is determined based on the number of spaced words between each two words in the text to be processed.

In the disclosure, when the number of words in the text to be processed between any two words is less than a first threshold, it may be determined that there is a connection edge between any two words, and the graph structure corresponding to the text to be processed is generated according to whether there is a connection edge between the words in the word sequence.

The first threshold may be the maximum number of spaced words in the text when any two words are semantically related. When the number of spaced words is greater than or equal to the first threshold, it may be determined that the two words have no semantic relationship. When the number of spaced words is less than the first threshold, it may be determined that there may be a semantic relationship between the two words. In addition, the graph structure may include multiple nodes and connection edges between nodes.

Optionally, the size of the first threshold may be preset or determined according to a type of text to be processed. For example, the first threshold corresponding to entertainment text may be the same as or may also be different from the first threshold corresponding to military text, which is not limited in the disclosure.

In the disclosure, each node in the graph structure corresponds to a word in the text to be processed. When the number of words between the words corresponding to any two nodes in the graph structure is less than the first threshold, a connection edge may be established between two nodes, so that the graph structure corresponding to the text to be processed may be determined.

Thus, when the number of words between two words is less than the first threshold, connection edges may be established at corresponding nodes in the graph structure, so that the dependency relationship between words may be represented by using the graph structure.

At 103, a topic distribution corresponding to the text is determined based on the word sequence and the graph structure.

It should be noted that, any word may appear in multiple topics of texts, but the probabilities of using the word in texts of different topics may be different. For example, "RMB" may have a probability of 0.7 in finance-topic text and have a probability of 0.4 in e-commerce-topic text. Therefore, a topic distribution label corresponding to each word in the disclosure may be determined first according to the probability of the word being used at each topic, and a preset word list may be determined based on the word and corresponding topic distribution labels.

Furthermore, a topic distribution label corresponding to each word in the word sequence may be determined based on the topic distribution label corresponding to the word in the preset word list. Then, according to dependency probabilities between preset topics and connection edges between the words in the graph structure, each topic distribution label corresponding to the word sequence is merged to determine the topic distribution corresponding to the text.

The topic distribution may include a probability that the topic of the text to be processed is each preset topic. For example, assuming that the preset topics include finance and e-commerce, and the topic distribution corresponding to the determined text to be processed is [0.3, 0.7], it means the probability that the topic of the text to be processed is a financial topic is 0.3, and the probability that the topic of the text to be processed is an e-commerce topic is 0.7.

The topic distribution label corresponding to a word may include the usage probability of the word in each topic text. For example, suppose the preset topics include: politics, military, entertainment, sports, a topic distribution label corresponding to a word is [0.7, 0.2, 0, 0.1], indicating that the usage probability of the word is used in the text of "politics" topic is 0.7, the usage probability in the text of "Military" topic is 0.3, the usage probability in the text of "Entertainment" topic is 0, the usage probability in the text of "Sports" topic is 0.1.

In this disclosure, according to the preset dependency probabilities between the topics, the topic distribution labels corresponding to the two words with connection edges may be fused sequentially. When the topic distribution labels corresponding to all the words with dependent edges in the graph structure are fused, the final fused topic distribution label may be determined as the topic distribution corresponding to the text to be processed.

For example, suppose the preset topics include: politics, military, entertainment and sports, the topic distribution label corresponding to word 1 is [0.7, 0.2, 0, 0.1], the topic distribution label corresponding to word 2 is [0.2, 0.6, 0.1, 0.1], then the dependence probability of the "political" topic on the "military" topic is 0.5, the dependence probability of the "military" topic on the "political" topic is 0.2, and there is no dependence among the other topics. When there is a connection edge between word 1 and word 2 in the graph structure, then in the fused label of the topic distribution labels corresponding to these two words, the probability of the "political" topic is: (0.7+0.2)/2+ (0.2*0.5+0.6*0.5)/2=0.65 and the probability corresponding to the "military" topic is: (0.2+0.6)/2+ (0.7*0.2+0.2*0.2)/2=0.49, and so on.

It should be noted that, the method of fusing the topic distribution labels between the above words is only as an example. Any method of determining the topic distribution corresponding to the text based on the topic distribution labels corresponding to each word and the dependency probability between the topics is fall in the protection scope of the disclosure.

Thus, the general content of the text to be processed may be analyzed through the topics with high probability in the topic distribution, so that the determined text topic distribution is interpretable.

At 104, a topic corresponding to the text is determined based on the topic distribution.

In the disclosure, after the topic distribution is determined, the topic corresponding to the maximum probability in the topic distribution may be determined as the topic corresponding to the text.

In the disclosure, after the word sequence corresponding to the text to be processed and the number of spaced words between each two words in the word sequence in the text to be processed are determined, the graph structure corresponding to the text to be processed may be determined according to the number of spaced words between each two words in the text to be processed, the topic distribution corresponding to the text may be determined according to the word sequence and graph structure, and the topic corresponding to the text may be determined according to the topic distribution. Therefore, the topic distribution corresponding to the text is determined according to the word sequence and graph structure and the topic corresponding to the text is determined, which not only enables the determined topic to consider the semantic information of the words in the text, but also to consider the dependencies between words in the text, improving correctness and reliability of the determined topic.

Through the above analysis, it may be seen that in the disclosure, after the word sequence and graph structure corresponding to the text to be processed are determined, the topic distribution corresponding to the text is determined based on the topic distribution labels corresponding to each word in the preset word list and the dependencies between the preset topics, in which the preset word list and the dependencies among the preset topics may be determined through statistical analysis of a large amount of text data.

Alternatively, in this disclosure, after the word sequence and graph structure corresponding to the text to be processed are determined, the word sequence and graph structure may be input into a topic generation model generated by training. The model may process the word sequence and graph structure based on information such as topic distribution labels obtained by training, to determine the topic corresponding to the text to be processed. In this disclosure, a large amount of text training data may be used to train and generate the topic generation model. Specifically, the preset topic distribution may be used as a model input, and the dependency probability between topics, the topic distribution labels corresponding to each word and an initial topic distribution function may be used as model training parameters. Afterwards, through training, the model outputs the graph structure and word sets corresponding to the training texts. The process of training the topic generation model may be described in detail below with reference to FIG. 2.

Figure 2:
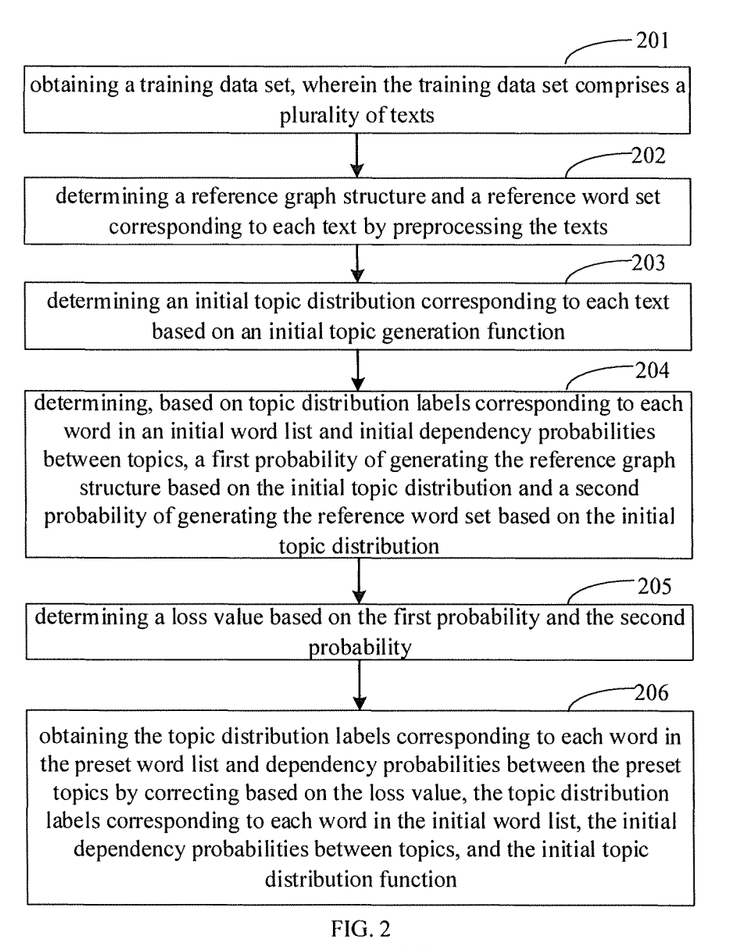
FIG. 2 is a schematic flowchart of another method for determining a text topic according to an embodiment of the disclosure.

FIG. 2 is a schematic flowchart of another method for determining a text topic according to an embodiment of the disclosure.

As shown in FIG. 2, the method includes the following steps at 201-206.

At 201, a training data set is obtained, in which the training data set includes a plurality of texts.

The training data set may be preset in a system or may be extracted from system logs, which is not limited in the disclosure.

At 202, the texts are preprocessed to determine a reference graph structure and a reference word set corresponding to each text.

The preprocessing process may be any process of determining the word sequence and graph structure corresponding to the text in the disclosure, which is not limited in the disclosure.

In the disclosure, the reference word set corresponding to each text may include words included in a word sequence corresponding to the text, and the reference graph structure corresponding to each text may be a graph structure corresponding to the text.

At 203, the initial topic distribution corresponding to each text is determined based on an initial topic generation function.

In the disclosure, the initial topic generation function may be preset in the system, and the initial topic distribution $\theta_d$ corresponding to each text may be then determined based on preset parameters by using the initial topic generation function.

The topic generation function may be a priori distribution function, which is not limited in this disclosure.

At 204, a first probability of generating the reference graph structure based on the initial topic distribution and a second probability of generating the reference word set based on the initial topic distribution are determined, based on topic distribution labels corresponding to each word in an initial word list and initial dependency probabilities between topics.

The initial word list may include a plurality of words and initial topic distribution labels corresponding to each word, etc., which is not limited in the disclosure. In addition, the initial word list and the initial dependency probabilities among the topics may be preset in the system.

In this disclosure, topic distribution labels corresponding to each reference word may be determined first according to the initial topic distribution, then the first probability of generating the reference map structure based on the initial topic distribution may be determined on the basis of the initial dependency probabilities among the topics and each reference word, the second probability of generating the reference word set based on the reference graph structure and the initial topic distribution may be determined on the basis of the topic distribution labels corresponding to each word in the initial word list. The reference word may be each word in the reference word set.

Therefore, by the first probability of generating the reference graph structure based on the initial topic distribution and the second probability of generating the reference word set based on the reference graph structure and the initial topic distribution, the semantic promotion relationship between words may be modeled, the ambiguity during determining the text topics may be eliminated, correctness and reliability of the determined topic are improved.

Specifically, assuming that after the topic distribution corresponding to the text is known, the topic distribution label $z_{d,n}$ corresponding to each word $w_{d,n}$ may be determined based on a multinomial distribution $\text{Multi}(\theta_d)$, so as to determine a topic distribution label set $Z_d$ corresponding to the text. Afterwards, on the basis of the initial dependency probabilities among the topics, it is determined that the first probability of generating the reference graph structure based on the topic distribution label set $Z_d$ and the second probability of generating the reference word set based on the reference graph structure and the topic distribution label set $Z_d$ on the basis of the topic distribution labels corresponding to each word in the initial word list.

In this disclosure, the graph structure may be deduced based on the topic distribution labels corresponding to each reference word and the dependency probabilities between topics, and the probability that the deduced graph structure is the reference graph structure may be calculated. This probability is the first probability of generating the reference graph structure based on the initial topic distribution.

The calculation formula of the first probability may be expressed as:

$$P(G_d^o | Z_d; M) = \Pi_{(n,n') \in E_d} m_{z_{d,n}, z_{d,n'}} \Pi_{(n,n') \notin E_d} (1 - m_{z_{d,n}, z_{d,n'}}).$$

where $G_d^o$ is the reference graph structure, $Z_d$ is the topic distribution label set, M is the dependency relationship between topics, n represents the position number of the reference word in the word sequence, $m_{i,j} \in [0,1]$ represents a dependency probability between topic i and j.

In the disclosure, according to the reference graph structure, the dependency probability between topics, and the dependency relationship between the known words, the word corresponding to each node in the graph structure may be determined from the initial word list, and the probability may be calculated that the word set including the word corresponding to each node in the graph structure is the reference word set, in which the probability is the second probability.

The calculation formula of the second probability may be expressed as:

$$p(V_d \mid G_d^o, Z_d) = \prod_{k=1}^{K} p(V_{d,k} \mid G_{d,k}^o, \beta_k)$$

$$p(V_{d,k} \mid G_{d,k}^o; \beta_k) = \frac{1}{|E_{d,k}|} \prod_{(w \in V_{d,k})} \beta_{k,w}^v \sum_{(w,w') \in E_{d,k}} \beta_{k,(w,w')}^{e'},$$

where $V_d$ is the reference word set, $G_d^o$ is the reference graph structure, $Z_d$ is the topic distribution label set, $\beta_k$ is the multinomial distribution corresponding to topic k, and $\beta_k$ may include the multinomial distribution $\beta_k^v$ of topic k on the word list and the multinomial distribution parameters $\beta_k^e$ on the dependence edge of the word.

Furthermore, $\beta_k^v$ and $\beta_k^e$ satisfy the following conditions:

$$\sum_{w \in V} \beta_{k,w}^v = 1$$

$$\sum_{w,w' \in V} \beta_{k,w}^v \beta_{k,w'}^v \beta_{k,(w,w')}^e = 1$$

$$\beta_{k,w}^v \geq 0$$

$$\beta_{k,(w,w')}^e \geq 0$$

At 205, a loss value is determined based on the first probability and the second probability.

In this disclosure, the higher the first probability and the second probability, the higher the probability that the graph structure and word set output by the model are the reference graph structure and the reference word set respectively, the more accurate the model prediction is, the more effective the parameters of the model are, the more accurate the topic distribution of the text determined based on the model parameters. The model parameters may include: topic distribution labels corresponding to each word in the initial word list, initial dependency probabilities among topics, and initial topic distribution functions.

In the disclosure, the sum of the first probability and the second probability may be determined as the loss value.

Optionally, after the first probability and the second probability are determined, a joint probability of the first probability and the second probability may be determined first, and the loss value may be determined based on the joint probability.

The calculation formula of the joint probability may be expressed as:

$$P(G_d, \theta_d, Z_d) = p(V_d \mid Z_d, G_d) p(G_d^o \mid z_d) \prod_{n=1}^{N_d} p(z_{d,n} \mid \theta_d) p(\theta_d \mid \alpha)$$

where $\theta_d$ is the topic distribution, $\alpha$ is a preset parameter, the graph form is $G_d = (V_d, E_d)$, $V_d$ is the reference word set, $G_d^o$ is the reference graph structure, and $Z_d$ is the topic distribution label set.

The formula for calculating the loss value may be expressed as:

$$L_d = E_{q(Z_d \mid G_d)}[\log p(G_d^o \mid Z_d; M) + \log p(V_d \mid Z_d, G_d^o; \beta)] - KL[q(\theta_d \mid G_g) \| p(\theta_d)] - E_{q(\theta_d \mid G_d)}\left[\sum_{n=1}^{N_d} KL[q(z_{d,n} \mid G_d, w_{d,n}) \| p(z_{d,n} \mid \theta_d)]\right],$$

where KL[•] may be a specific practice of KL (Kullback-Leibler, information) divergence for solving the model parameters.

At 206, the topic distribution labels corresponding to each word in the preset word list and dependency probabilities between the preset topics are obtained by correcting based on the loss value, the topic distribution labels corresponding to each word in the initial word list, the initial dependency probabilities between topics, and the initial topic distribution function.

In this disclosure, after the loss value is determined, the topic distribution labels corresponding to each word in the initial word list, the initial dependency probabilities between topics, and the initial topic distribution function may be corrected according to the loss value to maximize the loss value. After the loss value for the model is maximized, the corrected dependency probability between each topic and the topic distribution labels corresponding to each word in the word list may be obtained. In this way, the dependency probabilities between the preset topics and the accuracy of the topic distribution labels corresponding to each word in the preset word list are improved.

In this disclosure, after the training data set is obtained, the text may be preprocessed to determine the reference graph structure and the reference word set corresponding to each text. Then, the initial topic distribution corresponding to each text is determined based on the initial topic generation function. According to the topic distribution labels corresponding to each word in the initial word list and the initial dependency probabilities among the topics, it is determined the first probability of generating the reference graph structure based on the initial topic distribution and the second probability of generating the reference word set. Then, the loss value is determined according to the first probability and second probability. The topic distribution labels corresponding to each word in the initial word list, the initial dependency probabilities between the topics, and the initial topic distribution function are corrected based on the loss value, to obtain the topic distribution labels corresponding to each word in the preset word list and the dependency probabilities between the preset topics. Therefore, by jointly training the topic generation model with the distribution labels between the words and the dependency probabilities between the topics, the semantic promotion relationship between the words may be modeled, the ambiguity of the determined text topic may be eliminated, the accuracy and interpretability of the determined topic may be improved.

Figure 3:
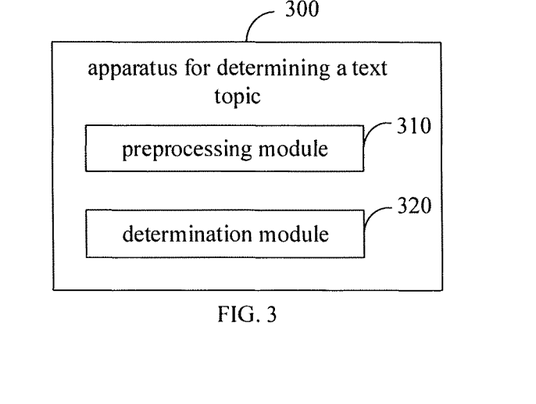
FIG. 3 is a structural schematic diagram of another apparatus for determining a text topic according to an embodiment of the disclosure.

In order to implement the above embodiments, the embodiment of the disclosure further proposes an apparatus for determining a text topic. FIG. 3 is a structural schematic diagram of another apparatus for determining a text topic according to an embodiment of the disclosure.

As shown in FIG. 3, the apparatus 300 for determining a text topic includes: a preprocessing module 310 and a determination module 320.

The preprocessing module 310 is configured to determine a word sequence corresponding to a text to be processed and a number of spaced words in the text to be processed between each two words in the word sequence.

The preprocessing module 310 is also configured to determine a graph structure corresponding to the text to be processed based on the number of spaced words between each two words in the text to be processed.

The determination module 320 is configured to determine a topic distribution corresponding to the text based on the word sequence and the graph structure.

The determination module 320 is also configured to determine a topic corresponding to the text based on the topic distribution.

In a possible implementation according to the embodiment of the disclosure, the above preprocessing module 310 is specifically configured to: in response to a number of words in the text to be processed between any two words being less than a first threshold, determine that there is a connection edge between the any two words; and generate the graph structure corresponding to the text to be processed based on whether there is a connection edge between words in the word sequence.

In a possible implementation according to the embodiment of the disclosure, the above determination module 320 is specifically configured to: determine topic distribution labels corresponding to each word in the word sequence based on topic distribution labels corresponding to each word in a preset word list; and determine the topic distribution corresponding to the text by merging each topic distribution label corresponding to the word sequence based on dependency probabilities between preset topics and connection edges between words in the graph structure.

In a possible implementation according to the embodiment of the disclosure, the apparatus also includes: an acquisition module and a correction module.

The acquisition module is configured to acquire a training data set, in which the training data set includes a plurality of texts.

The preprocessing module 310 is configured to determine a reference graph structure and a reference word set corresponding to each text by preprocessing the texts.

The determination module 320 is also configured to: determine an initial topic distribution corresponding to each text based on an initial topic generation function; determine a first probability of generating the reference graph structure based on the initial topic distribution and a second probability of generating the reference word set based on the initial topic distribution, based on topic distribution labels corresponding to each word in an initial word list and initial dependency probabilities between topics; and determine a loss value based on the first probability and the second probability.

The correction module is configured to correct based on the loss value, the topic distribution labels corresponding to each word in the initial word list, the initial dependency probabilities between topics, and the initial topic distribution function, so as to obtain the topic distribution labels corresponding to each word in the preset word list and dependency probabilities between the preset topics.

In a possible implementation according to the embodiment of the disclosure, the determination module 320 is specifically configured to: determine topic distribution labels corresponding to each reference word based on the initial topic distribution; determine the first probability of generating the reference graph structure based on the initial topic distribution on the basis of the initial dependency probabilities among the topics and each reference word; determine the second probability of generating the reference word set based on the reference graph structure and the initial topic distribution on the basis of the topic distribution labels corresponding to each word in the initial word list.

It should be noted that the explanations on the above embodiments of the method for determining a text topic are also applicable to the apparatus embodiment, details of which are not repeated here.

In the disclosure, after the word sequence corresponding to the text to be processed and the number of spaced words in the text to be processed between each two words in the word sequence are determined, the graph structure corresponding to the text to be processed may be determined according to the number of spaced words between each two words in the text to be processed, the topic distribution corresponding to the text may be determined according to the word sequence and graph structure, and the topic corresponding to the text may be determined according to the topic distribution. Therefore, the topic distribution corresponding to the text is determined according to the word sequence and graph structure and the topic corresponding to the text is determined, which not only enables the determined topic to consider the semantic information of the words in the text, but also to consider the dependencies between words in the text, improving correctness and reliability of the determined topic.

According to the embodiments of the disclosure, an electronic device, a readable storage medium, and a computer program product are also provided.

Figure 4:
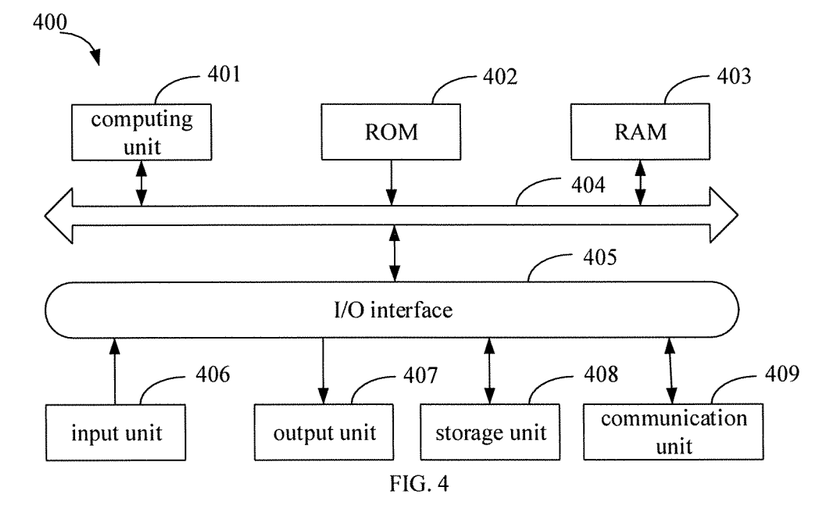
FIG. 4 is a block diagram of an electronic device that may be used to implement the method for determining a text topic according to an embodiment of the disclosure.

FIG. 4 shows a schematic block diagram of an example electronic device 400 that may be used to implement embodiments of the disclosure. The electronic device is intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or claimed herein.

As shown in FIG. 4, the device 400 includes a computing unit 401, which may perform various appropriate actions and processes based on computer programs stored in a Read-Only Memory (ROM) 402 computer programs loaded from the storage unit 408 to a Random Access Memory (RAM) 403. In the RAM 403, various programs and data needed for the operation of the device 400 can also be stored. The computing unit 401, the ROM 402 and the RAM 403 are connected to each other through a bus 404. An Input/Output (I/O) interface interface 405 is also connected to the bus 404.

Multiple components in the device 400 are connected to the I/O interface 405, including: an input unit 406, such as a keyboard, a mouse, etc.; an output unit 407, such as various types of displays, speakers, etc.; a storage unit 408, such as a magnetic disk, an optical disk, etc.; and a communication unit 409, such as a network card, a modem, a wireless communication transceiver, and the like. The communication unit 409 allows the device 400 to exchange information/data with other devices over a computer network such as the Internet and/or various telecommunication networks.

The computing unit 401 may be various general-purpose and/or special-purpose processing components having processing and computing capabilities. Some examples of computing unit 401 include but are not limited to a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller, etc. The computing unit 401 executes various methods and processes described above, such as a method for determining a text topic. For example, in some embodiments, a method for determining a text topic may be implemented as a computer software program tangibly embodied on a machine-readable medium, such as the storage unit 408. In some embodiments, part or all of the computer programs may be loaded and/or installed on the device 400 via the ROM 402 and/or the communication unit 409. When the computer program is loaded into the RAM 403 and executed by the computing unit 401, one or more steps of the method for determining a text topic described above may be performed. Alternatively, in other embodiments, the computing unit 401 may be configured in any other appropriate way (for example, by means of firmware) to execute the method for determining a text topic.

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, RAM, ROM, electrically programmable read-only-memory (EPROM), flash memory, fiber optics, Compact Disc Read-Only Memory (CD-ROM), optical storage devices, magnetic storage devices, or any suitable combination of the above.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein may be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve the defects of difficult management and weak business scalability in the traditional physical host and Virtual Private Server (VPS) service. The server can also be a server of distributed system or a server combined with a blockchain.

According to an embodiment of the disclosure, a computer program product is also provided. When instructions in the computer program product are executed by a processor, the method for determining a text topic in the above embodiments of the disclosure is implemented.

It should be understood that the various forms of processes shown above may be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions may be made based on design requirements and other factors. Any modification, equivalent replacement and improvement made within the spirit and principle of the disclosure shall be included in the protection scope of the disclosure.

What is claimed is:

1. A computer-implemented method for determining a text topic, comprising:
    determining a word sequence corresponding to a text to be processed and a number of spaced words in the text to be processed between each two words in the word sequence;
    determining a graph structure corresponding to the text to be processed based on the number of spaced words;
    determining a topic distribution corresponding to the text to be processed based on the word sequence and the graph structure, wherein determining the topic distribution corresponding to the text comprises: determining topic distribution labels corresponding to each word in the word sequence based on topic distribution labels corresponding to each word in a preset word list; determining the topic distribution corresponding to the text by merging the topic distribution labels corresponding to each word in the word sequence based on dependency probabilities between preset topics and connection edges between words in the graph structure;
    determining a topic corresponding to the text to be processed based on the topic distribution;
    obtaining a training data set, wherein the training data set comprises a plurality of texts;
    determining a reference graph structure and a reference word set corresponding to each text by preprocessing each of the texts;
    determining an initial topic distribution corresponding to each text based on an initial topic distribution function;
    determining, based on initial topic distribution labels corresponding to each word in an initial word list and initial dependency probabilities between the preset topics, a first probability of generating the reference graph structure based on the initial topic distribution and a second probability of generating the reference word set based on the initial topic distribution;
    determining a loss value based on the first probability and the second probability; and
    obtaining the topic distribution labels corresponding to each word in the preset word list and dependency probabilities between the preset topics by correcting based on the loss value, the topic distribution labels corresponding to each word in the initial word list, the initial dependency probabilities between the preset topics, and the initial topic distribution function.

2. The method of claim 1, wherein determining the graph structure corresponding to the text to be processed comprises:
    in response to a number of words in the text to be processed between any two words being less than a first threshold, determining that there is a connection edge between the any two words; and
    generating the graph structure corresponding to the text to be processed based on the determined connection edges between words in the word sequence.

3. The method of claim 1, wherein determining the first probability of generating the reference graph structure based on the initial topic distribution and the second probability of generating the reference word set based on the initial topic distribution comprises:
    determining topic distribution labels corresponding to each reference word based on the initial topic distribution;
    determining the first probability of generating the reference graph structure based on the initial topic distribution, on the basis of the initial dependency probabilities between the preset topics and the topic distribution labels for each reference word; and
    determining the second probability of generating the reference word set based on the reference graph structure and the initial topic distribution, on the basis of the topic distribution labels corresponding to each word in the initial word list.

4. An electronic device, comprising:
    at least one processor; and
    a memory configured to store instructions executable by the at least one processor,
    wherein the at least one processor is configured to:
    determine a word sequence corresponding to a text to be processed and a number of spaced words in the text to be processed between each two words in the word sequence;
    determine a graph structure corresponding to the text to be processed based on the number of spaced words;
    determine a topic distribution corresponding to the text to be processed based on the word sequence and the graph structure;
    determine topic distribution labels corresponding to each word in the word sequence based on topic distribution labels corresponding to each word in a preset word list;
    determine the topic distribution corresponding to the text by merging the topic distribution labels corresponding to each word in the word sequence based on dependency probabilities between preset topics and connection edges between words in the graph structure;
    acquire a training data set, in which the training data set includes a plurality of texts;
    determine a reference graph structure and a reference word set corresponding to each text by preprocessing each of the texts;
    determine an initial topic distribution corresponding to each text based on an initial topic distribution function;
    determine, based on initial topic distribution labels corresponding to each word in an initial word list and initial dependency probabilities between the preset topics, a first probability of generating the reference graph structure based on the initial topic distribution and a second probability of generating the reference word set based on the initial topic distribution;
    determine a loss value based on the first probability and the second probability; and
    obtain the topic distribution labels corresponding to each word in the preset word list and dependency probabilities between the preset topics by correcting based on the loss value, the topic distribution labels corresponding to each word in the initial word list, the initial dependency probabilities between the preset topics, and the initial topic distribution function.

5. The apparatus of claim 4, wherein the at least one processor is further configured to:
    in response to a number of words in the text to be processed between any two words being less than a first threshold, determine that there is a connection edge between the any two words; and generate the graph structure corresponding to the text to be processed based on the determined connection edges between words in the word sequence.

6. The apparatus of claim 4, wherein the at least one processor is further configured to:
   determine topic distribution labels corresponding to each reference word based on the initial topic distribution;
   determine the first probability of generating the reference graph structure based on the initial topic distribution, on the basis of the initial dependency probabilities between the preset topics and the topic distribution labels for each reference word; and
   determine the second probability of generating the reference word set based on the reference graph structure and the initial topic distribution on the basis of the topic distribution labels corresponding to each word in the initial word list.

7. A non-transitory computer-readable storage medium having computer instructions stored thereon, wherein the computer instructions are configured to cause a computer to implement a method for determining a text topic, the method comprising:
   determining a word sequence corresponding to a text to be processed and a number of spaced words in the text to be processed between each two words in the word sequence;
   determining a graph structure corresponding to the text to be processed based on the number of spaced words;
   determining a topic distribution corresponding to the text to be processed based on the word sequence and the graph structure, wherein determining topic distribution labels corresponding to each word in the word sequence based on topic distribution labels corresponding to each word in a preset word list; and determining the topic distribution corresponding to the text by merging the topic distribution labels corresponding to each word in the word sequence based on dependency probabilities between preset topics and connection edges between words in the graph structure;
   determining a topic corresponding to the text to be processed based on the topic distribution;
   obtaining a training data set, wherein the training data set comprises a plurality of texts;
   determining a reference graph structure and a reference word set corresponding to each text by preprocessing each of the texts;
   determining an initial topic distribution corresponding to each text based on an initial topic distribution function;
   determining, based on initial topic distribution labels corresponding to each word in an initial word list and initial dependency probabilities between the preset topics, a first probability of generating the reference graph structure based on the initial topic distribution and a second probability of generating the reference word set based on the initial topic distribution;
   determining a loss value based on the first probability and the second probability; and
   obtaining the topic distribution labels corresponding to each word in the preset word list and dependency probabilities between the preset topics by correcting based on the loss value, the topic distribution labels corresponding to each word in the initial word list, the initial dependency probabilities between the preset topics, and the initial topic distribution function.

8. The storage medium of claim 7, wherein determining the graph structure corresponding to the text to be processed comprises:
   in response to a number of words in the text to be processed between any two words being less than a first threshold, determining that there is a connection edge between the any two words; and
   generating the graph structure corresponding to the text to be processed based on the determined connection edges between words in the word sequence.

9. The storage medium of claim 7, wherein determining the first probability of generating the reference graph structure based on the initial topic distribution and the second probability of generating the reference word set based on the initial topic distribution comprises:
   determining topic distribution labels corresponding to each reference word based on the initial topic distribution;
   determining the first probability of generating the reference graph structure based on the initial topic distribution, on the basis of the initial dependency probabilities between the preset topics and the topic distribution labels for each reference word; and
   determining the second probability of generating the reference word set based on the reference graph structure and the initial topic distribution, on the basis of the topic distribution labels corresponding to each word in the initial word list.

* * * * *